United States Patent Office 3,442,013
Patented May 6, 1969

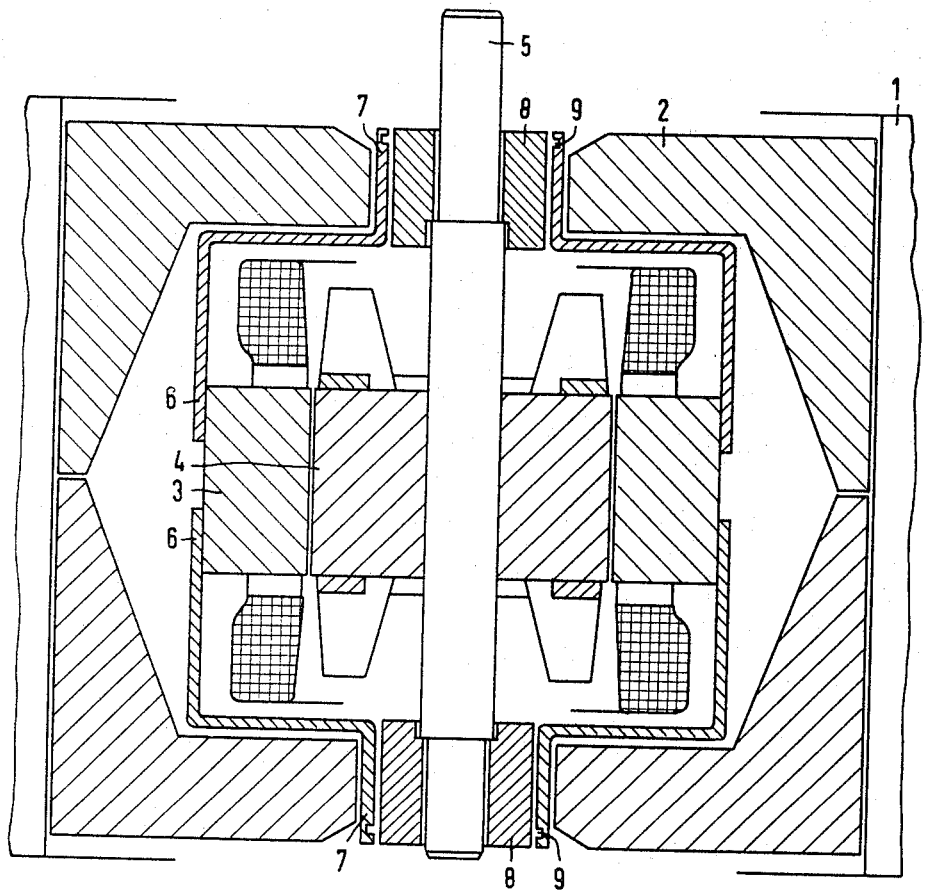

3,442,013
METHOD OF PRODUCING TIGHT FITS FOR BALL-BEARING HOLDERS BY MAGNETIC PULSE FORMING
Horst Schenk, Erlangen, and Erhard Prolss, Katzwang, Germany, assignors to Siemens Aktiengesellschaft, Berlin and Munich, Germany, a corporation of Germany
Filed Sept. 21, 1967, Ser. No. 669,606
Claims priority, application Germany, Sept. 23, 1966, S 106,046
Int. Cl. H02k 15/02, 5/16; B21d 26/02
U.S. Cl. 29—596       3 Claims

ABSTRACT OF THE DISCLOSURE

Method of producing tight fits for ball-bearing holders by magnetic pulse forming which comprises mounting on a shaft, instead of the ball-bearing, a cylindrical phantom thereof consisting of material having a tensile strength substantially equal at least to that of steel and having an outer diameter that is greater than the clearance required for the respective ball bearing at the location of fit, placing a bearing holder in the form of an encasing tube of electrically conductive material over the phantom, and pressing the bearing holder rigidly against the phantom by a magnetic pulse forming process, thereafter removing the phantom and mounting the ball bearing on the shaft in place thereof, and fixing the ball bearing thereon against axial movement relative thereto.

Our invention relates to method of producing tight fits for ball-bearing holders seated on a shaft by employing a magnetic pulse forming process.

The magnetic pulse forming process disclosed in U.S. Patent 2,976,907 utilizes the physical phenomenon that a time-varying magnetic field exerts pressure on a metallic surface. By discharging a high voltage capacitor, an axially directed pulsating magnetic field is formed within a coil having an air core (the working coil) wherein a metallic workpiece is located, producing an azimuthol eddy current in the workpiece. The eddy current is restricted by "skin effect" to the outer surface region of the workpiece when the frequency of the oscillating circuit formed by the working coil and the capacitor and the electrical conductivity of the workpiece are sufficiently high enough. The inner cross section of the workpiece is then virtually free of the field so that the pulsating magnetic field is concentrated on the gap between the coil and the workpiece. Field concentrators for stabilizing the working coil and for concentrating the forming pressure are employed at specific locations of the workpiece when carrying out high-speed forming of metals with a magnetic pulse forming process. Slotted or divided hollow cylinders of copper or aluminum alloy are employed, for example, as field concentrators for the compression of workpieces, and are insulated from the workpieces. The forming of the workpiece is effected in the hollow core between the extremities of the coil windings.

It has been known to fix slide bearings by a magnetic pulse forming process in the bore of a bearing plate without requiring exact tolerance restrictions for the outer surface of these bearings. Ball bearings, however, cannot generally be shot into position by an encasing tube with the magnetic pulse forming process, because the outer ring in a snug fit must be slidingly guided so as to be able to compensate for thermal expansion of the components thereof. Moreover, if the outer ring or race of the ball bearing has a wall thickness that is too small, an undue stressing of the ball bearing is produced by the exploded encasing tube.

It is accordingly an object of our invention to provide method of producing tight fits for ball-bearing holders by magnetic pulse forming which avoids the disadvantages of the heretofore known methods.

More particularly, it is our object to provide a method of producing tight fits for ball-bearing holders seated on a shaft which avoids large tolerances of the components at the location of the ball bearing, yet nevertheless results in the required tight fit.

With the foregoing and other objects in view, we provide in accordance with our invention, method of producing tight fits for ball-bearing holders by magnetic pulse forming which comprises mounting on a shaft, instead of the ball bearing, a cylindrical phantom consisting of material having a tensile strength substantially equal at least to that of steel and having an outer diameter that is greater than the clearance required for the respective ball bearing at the location of fit, placing a bearing holder in the form of an encasing tube of electrically conductive material over the phantom, and pressing the bearing holder rigidly against the phantom by a magnetic pulse forming process, thereafter removing the phantom, and mounting the ball bearing on the shaft in place thereof and fixing the ball bearing thereon against axial movement relative thereto.

In accordance with other features of our invention, the phantom is a hardened and polished hollow steel cylinder, and the ball bearing is fixed on the shaft with the aid of lock washers and annular springs.

Other features which are considered as characteristic for the invention are set forth in the appended claims.

Although the invention is illustrated and described herein as method of producing tight fits for ball-bearing holders by magnetic pulse forming, it is neverethless not intended to be limited to the details shown, since various modifications and changes may be made therein without departing from the spirit of the invention and within the scope and range of equivalents of the claims.

The method of the invention, however, together with additional objects and advantages thereof will be best understood from the following description of a mode thereof when read in connection with the accompanying single figure of the drawing showing in schematic cross-sectional view the final assembly of an electric motor wherein tight fits for ball bearings are produced with the aid of a magnetic pulse forming process.

Referring now to the drawing, there is shown an air core working coil 1 of a conventional magnetic pulse forming device provided with field concentrators 2 which surround the electric motor consisting of a stator 3 and a rotor 4 mounted on a rotatable shaft 5. Pot-shaped encasing tubes 6 have a necked-down open portion 7 through which the respective opposite ends of the shaft 5 extend. The ball bearings (not shown) are to be located within the respective portions 7 of reduced diameter. Instead of the ball bearings, a hardened and polished hollow steel cylinder 8 is mounted on the opposite ends of the shaft 5 within the narrow portion 7 of the encasing tubes 6, respectively, and serve as phantoms or stand-ins for the ball bearings. Annular grooves 9 are provided in the interior surface of the narrow portions 7, respectively, for subsequently receiving non-illustrated lock washers therein.

The rotor 4, on the shaft 5 of which the ball bearings have not yet been mounted, is coordinated with the stator 3 over air-gap or spacer needles. The encasing tube, consisting of two pot-like parts 6 having narrowed passageways 7 at the eventual location of the ball bearings, is slid over the assembled rotor 4 and stator 3. The encasing tube is fixed to the stator 3 in a known manner by a magnetic pulse forming and compression process. The tight or flush fit for the ball bearings is produced by applying a conventional magnetic pulse forming and compression process to the narrow portions 7 of the encasing tube so as to press the narrow portions 7 against the hollow cylinders 8, respectively. For this purpose, the hollow cylinders 8 are mounted respectively on the ends of the shaft 5, the outer diameter of the cylinders 8 being greater than the clearance of the ball bearings to be subsequently mounted in the fit location. The tempered and polished hollow cylinders 8 must, of course, be slid onto the rotor shaft 5 so that they are in flush or tight fit engagement therewith, and the outer surface of the cylinders 8 must be concentric to or coaxial with the inner surface. After forming the reduced passage portions 7 to reduced tolerances on both sides of the motor, the hollow cylinders 8 are removed, for example, with a suitable pulling device and the ball bearings (not shown) are press-fitted on the rotor shaft 5 in place of the cylinders 8. The ball bearings are then fixed against axial movement relative to the shaft 5 by snapping spring-biased lock washers (so-called Seeger rings) into the annular grooves 9 formed on the inner surface of the reduced passage portion 7.

A particular advantage of the method of our invention is that, to obtain the tight fit of the ball bearing within the bearing support, the latter does not have to be machined exactly, as by turning in a lathe, beforehand.

A further advantage is that when forming a pair of tight-fitting joints, for example for a motor shaft journalled on ball bearings at both ends thereof, the tight-fitting joints can be produced in alignment with one another.

We claim:

1. Method of producing tight fits for ball-bearing holders by magnetic pulse forming which comprises mounting on a shaft, instead of a ball bearing, a cylindrical phantom thereof formed of material having a tensile strength at least substantially equal to the tensile strength of steel and having an outer diameter greater than the clearance required for the respective ball bearing at the location of fit, placing a bearing holder in the form of an encasing tube of electrically conductive material over the phantom, and pressing the bearing holder rigidly against the phantom by a magnetic pulse forming process, thereafter removing the phantom and mounting the ball bearing on the shaft in place thereof, and fixing the ball bearing thereon against axial movement relative to the shaft.

2. Method according to claim 1 wherein the phantom is a tempered and polished hollow steel cylinder and is shoved onto the shaft.

3. Method according to claim 1 wherein the ball bearing is fixed against axial movement by disposing a spring-biased lock washer in mutual locking engagement with the ball bearing and a reduced portion of the bearing holder.

References Cited

UNITED STATES PATENTS

| | | | |
|---|---|---|---|
| 3,156,076 | 11/1964 | Origoni | 29—596 |
| 3,214,511 | 10/1965 | Franklin | 29—421 |
| 3,320,660 | 5/1967 | Otto | 29—596 |

RICHARD J. HERBST, *Primary Examiner.*

U.S. Cl. X.R.

72—56; 29—421, 525; 310—90